United States Patent
Chen

(10) Patent No.: US 8,044,854 B2
(45) Date of Patent: Oct. 25, 2011

(54) METHOD FOR CALCULATING CURRENT POSITION COORDINATE AND METHOD FOR CALCULATING PSEUDO RANGE

(75) Inventor: Hung-Sheng Chen, Banqiao (TW)

(73) Assignee: Altek Corporation, Hsinchu (TW)

( * ) Notice: Subject to any disclaimer, the term of this patent is extended or adjusted under 35 U.S.C. 154(b) by 428 days.

(21) Appl. No.: 12/408,077

(22) Filed: Mar. 20, 2009

(65) Prior Publication Data

US 2010/0149034 A1    Jun. 17, 2010

(30) Foreign Application Priority Data

Dec. 17, 2008  (TW) .............................. 97149269 A

(51) Int. Cl.
  *G01S 19/24*  (2010.01)
  *G01S 5/14*   (2006.01)
  *G01S 1/00*   (2006.01)
  *G01S 1/04*   (2006.01)

(52) U.S. Cl. ................................. 342/357.63

(58) Field of Classification Search ............. 342/357.63, 342/357.12; G01S 5/14
See application file for complete search history.

(56) References Cited

U.S. PATENT DOCUMENTS

| | | | |
|---|---|---|---|
| 5,430,654 A * | 7/1995 | Kyrtsos et al. | 701/215 |
| 6,842,715 B1 * | 1/2005 | Gaal | 702/152 |
| 2007/0037588 A1 * | 2/2007 | Mohi et al. | 455/456.5 |
| 2008/0032706 A1 * | 2/2008 | Sheynblat et al. | 455/456.1 |

FOREIGN PATENT DOCUMENTS

KR    10-0871258    * 11/2008

* cited by examiner

*Primary Examiner* — Thomas Tarcza
*Assistant Examiner* — Frank McGue
(74) *Attorney, Agent, or Firm* — Apex Juris, pllc; Tracy M. Heims

(57) ABSTRACT

A method for calculating current position coordinate and a method for calculating a pseudo range are applied to a global positioning system (GPS) receiver. A position coordinate of the GPS receiver at the positioning time point is calculated through an average pseudo range between the GPS receiver and each satellite at a positioning time point. With regard to calculating the average pseudo range between the GPS receiver and each satellite, for each satellite, original pseudo ranges are obtained through calculating a pseudo range between the satellite and the GPS receiver at each millisecond (ms) in a time range including the positioning time point, and then the average pseudo range between the satellite and the GPS receiver at the positioning time point is obtained through calculating an average value of the obtained original pseudo ranges between the GPS receiver and the satellite.

6 Claims, 3 Drawing Sheets

METHOD FOR CALCULATING CURRENT POSITION COORDINATE AND METHOD FOR CALCULATING PSEUDO RANGE

CROSS-REFERENCE TO RELATED APPLICATIONS

This non-provisional application claims priority under 35 U.S.C. §119(a) on Patent Application No(s). 097149269 filed in Taiwan, R.O.C. on Dec. 17, 2008 the entire contents of which are hereby incorporated by reference.

BACKGROUND OF THE INVENTION

1. Field of Invention

The present invention relates to a global positioning system (GPS), and more particularly to a method for calculating current position coordinate and a method for calculating a pseudo range, which are applicable to a GPS receiver.

2. Related Art

Global navigation satellite system is also called GPS. In the past, the GPS is only limited to military purpose and industrial purpose. With the continuous development of the technology, the GPS begins to be applied to various civil purposes. Generally, the GPS products mainly refer to GPS receivers applied to various purposes, for example, receivers for aviation and voyage purposes, automobile navigation devices, hand-held receivers for mountaineering and entertainment, and other types of communication products. The common GPS product mainly includes an internal antenna, a chipset, external keys, a display panel, and other related parts.

The GPS receiver determines positions by utilizing satellites surrounding the earth.

When each satellite operates, one coordinate value representing the position (known) exists at any moment. The position coordinate of each satellite is provided by a respective ephemeris data of the satellite.

The position coordinate of the GPS receiver is unknown. The GPS receiver compares a clock of a satellite signal and a clock generated in the GPS receiver, so as to calculate the time cost during a process of transmitting the satellite signal. The time difference (that is, the time cost during the process of transmitting the satellite signal) value is multiplied by an electric wave transmission speed (generally the speed of light), so as to calculate a distance between the satellite and the GPS receiver, which is called a pseudo range. According to the triangle vector, a related equation is given for the pseudo range.

When the satellite signal of one satellite is received, one related equation is given. Therefore, when the satellite signals of three satellites are received, plane coordinate values (that is, longitude and latitude) are calculated. The calculated plane coordinate values are the position coordinate of the GPS receiver. When the satellite signals of four satellites are received, in addition to the plane coordinate values (that is, the longitude and the latitude), a height value is also calculated. Further, if the satellite signals of more than five satellites are utilized, the accuracy of the calculated position coordinate is improved.

Generally, the GPS receiver automatically and continuously receives the satellite signals, and re-calculates virtual coordinate at each second, so as to calculate the position coordinate of the position on real time. That is to say, the position coordinate of the GPS receiver at each second is the latest.

However, by reason of the effect of the environment during the process of transmitting the satellite signal, practically noises exist in the satellite signal received by the GPS receiver, such that the calculated pseudo range generates errors, so as to affect the accuracy of the positioning information (that is, the position coordinate of the current position of the GPS receiver).

In the prior art, mainly the effect of the noises is reduced by utilizing a kalman filter, but the achieved effect is quite limited.

SUMMARY OF THE INVENTION

In view of the above problems, the present invention is directed to a method for calculating current position coordinate and a method for calculating a pseudo range, which are capable of solving the problem of the prior art of positioning errors resulting from noises in satellite signals.

The method for calculating the pseudo range of the present invention is applied to a GPS receiver.

Firstly, at least three satellites are tracked, and complete ephemeris data of the tracked satellites is obtained.

An average pseudo range between the satellites and the GPS receiver at a positioning time point is calculated, and position coordinates of the satellites at the positioning time point are obtained through the ephemeris data of the satellites.

Then, the position coordinate of the GPS receiver at the positioning time point are calculated by utilizing the position coordinates of the at least three satellites and average pseudo ranges related to the satellites at the positioning time point.

Here, the average pseudo range between each satellite and the GPS receiver may be calculated in the method as follows. For example, a method for calculating the average pseudo range between one satellite and the GPS receiver is given for illustration.

After a complete ephemeris data is obtained, the satellite is continuously tracked, so as to receive a satellite signal from the tracked satellite.

A pseudo range between the satellite and the GPS receiver is calculated at each millisecond (ms) in a time range including the positioning time point by utilizing the received satellite signal, so as to obtain a plurality of original pseudo ranges.

Then, all the obtained original pseudo ranges between the satellite and the GPS receiver are aggregated, and an average value is obtained accordingly, so as to obtain the average pseudo range between the satellite and the GPS receiver at the positioning time point.

A time difference between a starting time point and the positioning time point is within 1 second (s). A time difference between the positioning time point and an ending time point is within 1 s.

To sum up, when the method for calculating the pseudo range of the present invention is applied to the GPS receiver, a relatively accurate pseudo range may be provided, so as to greatly improve the positioning accuracy of the GPS receiver.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
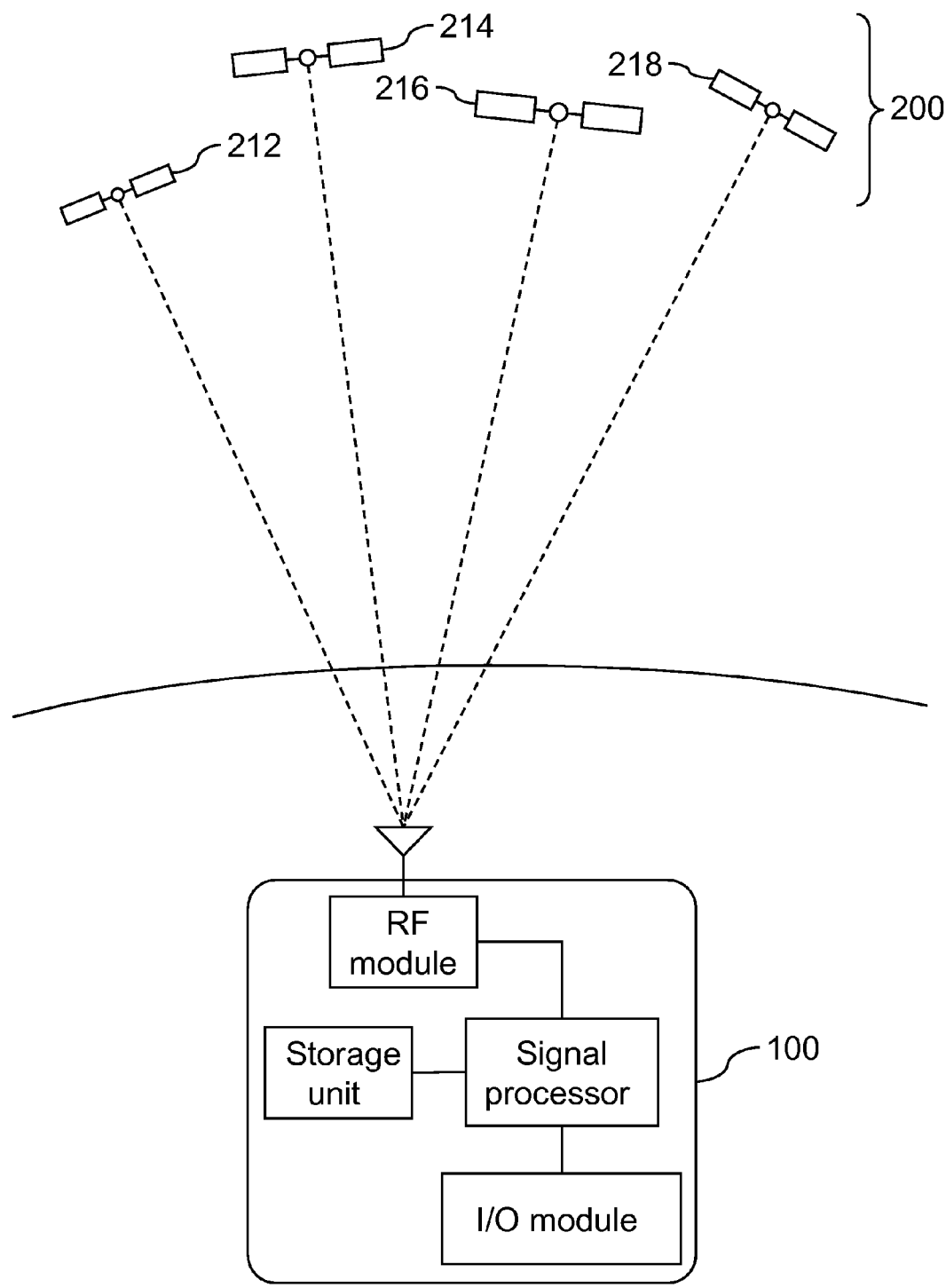
FIG. 1 is a GPS receiver applying an embodiment of the present invention.
Figure 2:
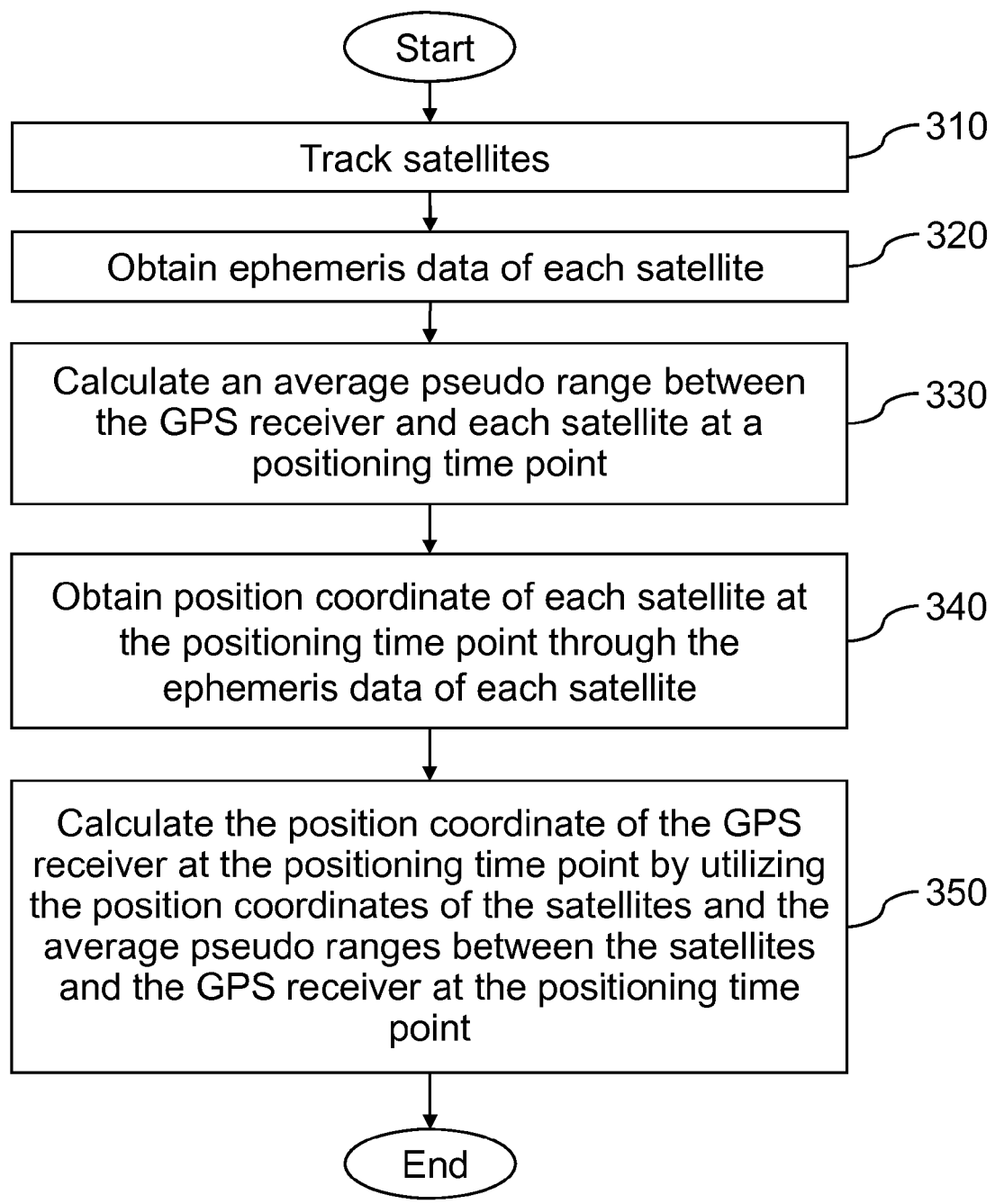
FIG. 2 is a flow chart of a method for calculating current position coordinate according to an embodiment of the present invention.

FIG. 1 is a GPS receiver applying an embodiment of the present invention, and FIG. 2 is flow chart of a method for calculating current position coordinate according to an embodiment of the present invention.

Referring to FIGS. 1 and 2, the method for calculating the current position coordinate may be applied to a GPS receiver 100.

After being started, the GPS receiver 100 searches for each satellite in a track satellite group 200 one by one, so as to track at least three satellites 212, 214, 216, and 218 in the track satellite group 200 (Step 310), and receive satellite signals of the at least three satellites 212, 214, 216, and 218 in the track satellite group 200, so as to download a series of ephemeris data, until obtaining the complete ephemeris data of the at least three satellites 212, 214, 216, and 218 (Step 320).

After obtaining the complete ephemeris data, the GPS receiver 100 processes positioning information.

For the positioning of the GPS receiver 100 at a positioning time point (t1), the GPS receiver 100 calculates average pseudo ranges between the at least three satellites 212, 214, 216, and 218 and the GPS receiver 100 at the positioning time point (t1). Here, the GPS receiver 100 has the complete ephemeris data of the satellites 212, 214, 216, and 218 with the pseudo range to be calculated (Step 330).

The GPS receiver 100 obtains the position coordinates of the satellites 212, 214, 216, and 218 at the positioning time point (t1) through the received ephemeris data (Step 340).

For example, three satellites are utilized for positioning. For ease of illustration, the three satellites are respectively called a first satellite 212, a second satellite 214, and a third satellite 216.

The GPS receiver 100 calculates an average pseudo range (Rm1) between the first satellite 212 and the GPS receiver 100, an average pseudo range (Rm2) between the second satellite 214 and the GPS receiver 100, and an average pseudo range (Rm3) between the third satellite 216 and the GPS receiver 100 at the positioning time point (t1). The GPS receiver 100 respectively obtains the position coordinates (S1(Xs1, Ys1), S2(Xs2, Ys2), and S3(Xs3, Ys3)) of the first satellite 212, the second satellite 214, and the third satellite 216 at the positioning time point (t1) by utilizing the ephemeris data of the first satellite 212, the second satellite 214, and the third satellite 216.

Finally, the GPS receiver 100 calculates the position coordinate (A(Xu, Yu)) of the GPS receiver 100 at the positioning time point (t1) by utilizing the position coordinates of the first satellite 212, the second satellite 214, and the third satellite 216, and the average pseudo ranges respectively between the first satellite 212, the second satellite 214, the third satellite 216, and the GPS receiver 100 (Rm1, Rm2, and Rm3) at the positioning time point (t1) (Step 350).

Figure 3:
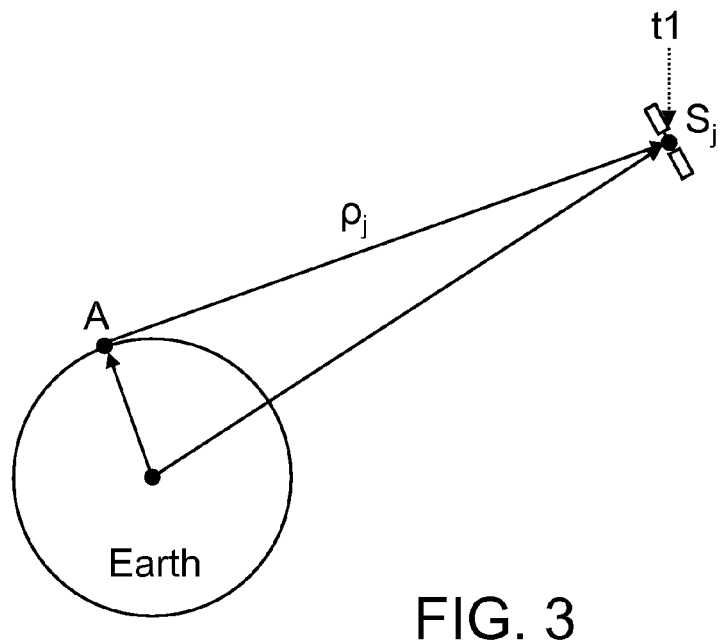
FIG. 3 is shows a relative position between the GPS receiver applying an embodiment of the present invention and a satellite.

In other words, in order to calculate the position coordinate (A(Xu, Yu)) of the GPS receiver 100, Equation 1 as follows may be utilized.

$$\rho_j = \|S_j - A\| + C \times \Delta Tu \qquad \text{Equation 1}$$

j is a satellite number, $\rho j$ is the pseudo range of the $j^{th}$ satellite, Sj is the position coordinate of the $j^{th}$ satellite, A is the current position coordinate (that is, the position coordinate of the GPS receiver 100), C is an electric wave transmission speed (generally the speed of light), and $\Delta Tu$ is a time error between a clock of the GPS receiver 100 and a system clock, as shown in FIG. 3, in which j is a positive integer.

The above obtained position coordinates (S1(Xs1, Ys1), S2(Xs2, Ys2), and S3(Xs3, Ys3)) of the satellites and average pseudo ranges (Rm1, Rm2, and Rm3) are substituted into the Equation 1, so as to obtain three related equations.

By utilizing the position coordinate (S1(Xs1, Ys1)) of the first satellite 212 at the positioning time point (t1) and the average pseudo range (Rm1) between the first satellite 212 and the GPS receiver 100, Equation 2 is obtained.

$$Rm1 = \sqrt{(Xs1-Xu)^2 + (Ys1-Yu)^2} + C \times \Delta Tu \qquad \text{Equation 2}$$

By utilizing the position coordinate (S2(Xs2, Ys2)) of the second satellite 214 at the positioning time point (t1) and the average pseudo range (Rm2) between the second satellite 214 and the GPS receiver 100, Equation 3 is obtained.

$$Rm2 = \sqrt{(Xs2-Xu)^2 + (Ys2-Yu)^2} + C \times \Delta Tu \qquad \text{Equation 3}$$

By utilizing the position coordinate (S3(Xs3, Ys3)) of the third satellite 216 at the positioning time point (t1) and the average pseudo range (Rm3) between the third satellite 216 and the GPS receiver 100, Equation 4 is obtained.

$$Rm3 = \sqrt{(Xs3-Xu)^2 + (Ys3-Yu)^2} + C \times \Delta Tu \qquad \text{Equation 4}$$

The position coordinates (S1(Xs1, Ys1), S2(Xs2, Ys2), and S3(Xs3, Ys3)) of the satellites and the average pseudo ranges (Rm1, Rm2, and Rm3) are known, but the position coordinate (A(Xu, Yu)) of the GPS receiver 100 and the time error ($\Delta Tu$) between the clock of the GPS receiver 100 and the system clock are unknown.

Therefore, by utilizing the three obtained related equations (that is, Equation 2, Equation 3, and Equation 4), plane coordinate values of the GPS receiver 100, that is, the position coordinate (A(Xu, Yu)), may be obtained.

Similarly, when the GPS receiver 100 utilizes four satellites for positioning (that is, j=1-4), four related equations may be obtained by utilizing the position coordinates (Sj(Xsj, Ysj)) of the four satellites and the average pseudo ranges (Rmj) related to the four satellites, so as to obtain the position coordinate (A(Xu, Yu, Zu)), that is, longitude, latitude, and height of the GPS receiver 100 by utilizing four related equations.

Therefore, the GPS receiver 100 outputs the obtained position coordinate (A(Xu, Yu, Zu)) to a user interface for providing to the user at the positioning time point (t1), that is, displays the obtained position coordinate (A(Xu, Yu, Zu)) at the positioning time point (t1).

The average pseudo range (Rmj) between each satellite 212/214/216/218 and the GPS receiver 100 may be calculated by the method as follows.

Figure 4:
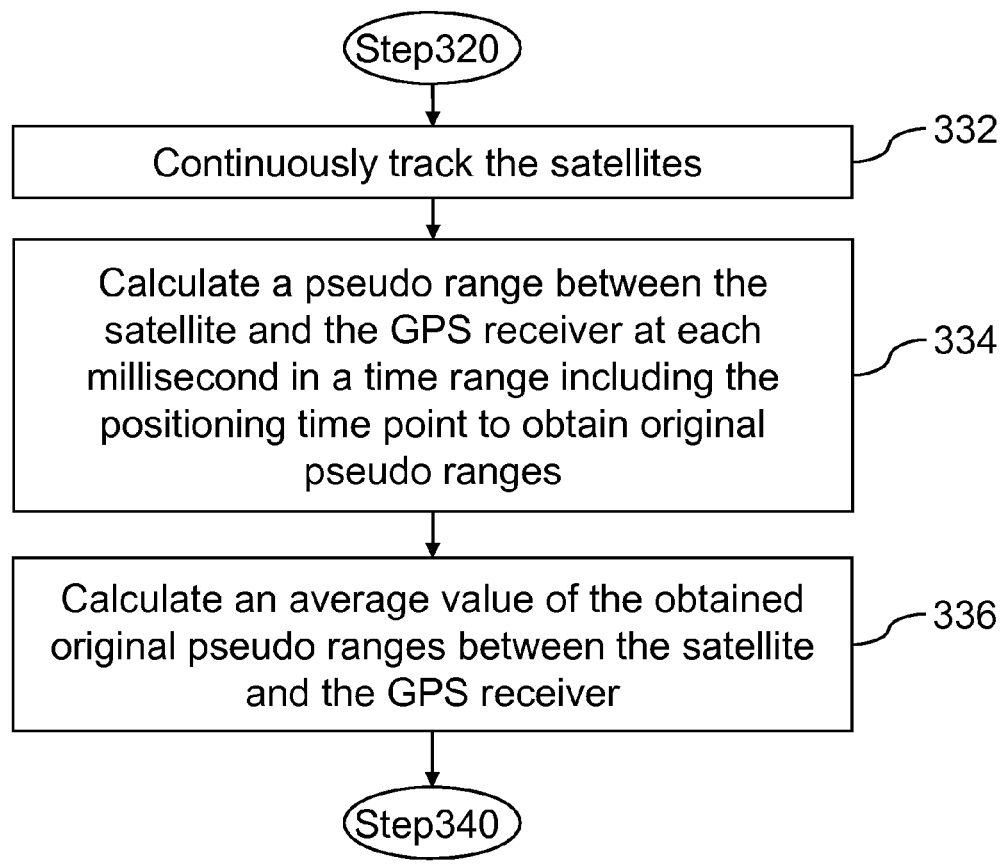
FIG. 4 is a method for calculating a pseudo range according to an embodiment of the present invention.

For example, the average pseudo range (Rm1) between the satellite 212 and the GPS receiver 100 at the positioning time point (t1) is calculated. Referring to FIG. 4, after obtaining the complete ephemeris data, the GPS receiver 100 still continuously tracks the satellite 212, so as to receive the satellite signal from the tracked satellite 212 (Step 332).

Then, the GPS receiver 100 calculates the pseudo range (hereafter referred to as original pseudo range Ro) between the satellite 212 and the GPS receiver 100 at each ms in a time range ($\Delta t$) including the positioning time point (t1) by utilizing the received satellite signal, so as to obtain a plurality of original pseudo ranges Ro (Step 334). Here, the time range ($\Delta t$) is from a starting time point (ts) to an ending time point (te), and the positioning time point (t1), the starting time point (ts), and the ending time point (te) are different from one another. That is to say, the positioning time point (t1) is located between the starting time point (ts) and the ending time point (te).

A time difference between the starting time point (ts) and the positioning time point (t1) is within 1 s. A time difference between the positioning time point (t1) and the ending time point (te) is within 1 s.

Then, the GPS receiver 100 aggregates the obtained original pseudo ranges Ro between the satellite 212 and the GPS receiver 100 and then obtains the average value accordingly, to obtain the average pseudo range (Rm1) between the satellite 212 and the GPS receiver 100 at the positioning time point (t1) (Step 336).

In other words, the GPS receiver 100 calculates the distance between the satellite and the GPS receiver by utilizing the data before and after the positioning time point in addition to the data of the positioning time point, so as to reduce the effect of the noise through the average value, thereby obtaining the relatively accurate pseudo range.

An average positioning error test is performed on the GPS receiver applying the prior art and the GPS receiver applying the present invention, as shown in Table 1 as follows. In the GPS receiver applying the present invention, the time difference between the starting time point (ts) and the positioning time point (t1) is 100 ms, and the time differences between the positioning time point (t1) and the ending time point (te) are respectively 10 ms, 50 ms, 100 ms, 200 ms, 500 ms, and 1 s.

TABLE 1

| Testing Item | Average Positioning Error (Meter) |
|---|---|
| Prior art | 9.77 |
| 10 ms | 7.93 |
| 50 ms | 6.32 |
| 100 ms | 6.14 |
| 200 ms | 5.94 |
| 500 ms | 5.89 |
| 1 s | 5.90 |

It may be known from Table 1 that as compared with the prior art, the positioning accuracy of the GPS receiver applying the present invention is greatly improved.

Here, the method for calculating the current position coordinate and the method for calculating the pseudo range according to the present invention may be built in a storage unit of the GPS receiver through software and firmware programs, and a processor of the GPS receiver executes the built-in software and firmware programs, so as to realize the method for calculating the current position coordinate and the method for calculating the pseudo range according to the present invention, in which the storage unit is realized by one or more memories.

The GPS receiver usually includes an antenna, a radio frequency (RF) module, a controller, and an input/output (I/O) module.

The antenna is electrically connected to the RF module. The RF module has an oscillator. The RF module provides a specific frequency by utilizing the oscillator, and is wirelessly connected with the satellites in the track satellite group through the antenna by utilizing the specific frequency. After the RF module and the satellite form the wireless connection, the RF module wirelessly receives the satellite signals from the satellites through the antenna.

The controller is electrically connected to the RF module, and resolves the satellite signals received by the RF module, so as to obtain various positioning information from the satellite signals. The positioning information includes pseudo-random codes, the ephemeris data, and other data.

The I/O module is electrically connected to the controller. The I/O module provides the user interface and/or various input and/or output connection ports.

The controller may be the processor, and may also be an additionally disposed controller.

Further, the GPS receiver is a single unit device, and may also be integrated with other devices (such as a mobile communication device and a computer).

To sum up, when being applied to the GPS receiver, the method for calculating the current position coordinate and the method for calculating the pseudo range according to the present invention calculates a relatively more accurate pseudo range by utilizing the data before and after the positioning time point, so as to greatly improve the positioning accuracy of the GPS receiver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for calculating current position coordinate, applied to a global positioning system (GPS) receiver, comprising:

tracking at least three satellites;

obtaining an ephemeris data of each of the tracked satellites;

calculating an average pseudo range between the GPS receiver and each of the tracked satellites at a positioning time point, comprising:

calculating a pseudo range between the satellite and the GPS receiver at each millisecond (ms) in a time range comprising the positioning time point to obtain a plurality of original pseudo ranges, wherein the time range is from a starting time point to an ending time point, and the positioning time point, the starting time point, and the ending time point are different from one another; and calculating an average value of the plurality of obtained original pseudo ranges to obtain the average pseudo range corresponding to each of the tracked satellites;

obtaining a position coordinate of each of the tracked satellites at the positioning time point from the respective ephemeris data of each of the satellites; and calculating a position coordinate of the GPS receiver at the positioning time point by utilizing the position coordinates of the at least three satellites and the obtained average pseudo ranges corresponding to the at least three satellites at the positioning time point.

2. The method for calculating current position coordinate according to claim 1, wherein a time difference between the starting time point and the positioning time point is within 1 second (s).

3. The method for calculating current position coordinate according to claim 1, wherein a time difference between the positioning time point and the ending time point is within 1 s.

4. A method for calculating a pseudo range, applied to a global positioning system (GPS) receiver, comprising:

tracking a satellite;

calculating a pseudo range between the tracked satellite and the GPS receiver at each millisecond (ms) in a time range comprising the positioning time point to obtain a plurality of original pseudo ranges, wherein the time range is from a starting time point to an ending time point, and the positioning time point, the starting time point, and the ending time point are different from one another; and calculating an average value of the plurality of obtained original pseudo ranges to obtain an average pseudo range for calculating positioning information of the GPS receiver at the positioning time point.

5. The method for calculating a pseudo range according to claim 4, wherein a time difference between the starting time point and the positioning time point is within 1 second (s).

6. The method for calculating a pseudo range according to claim 4, wherein a time difference between the positioning time point and the ending time point is within 1 s.

* * * * *